United States Patent
Coronado et al.

(10) Patent No.: US 9,619,311 B2
(45) Date of Patent: Apr. 11, 2017

(54) ERROR IDENTIFICATION AND HANDLING IN STORAGE AREA NETWORKS

(71) Applicant: International Business Machines Corporation, Armonk, NY (US)

(72) Inventors: Juan A. Coronado, Tucson, AZ (US); Lisa R. Martinez, Escondido, CA (US); James E. Olson, Seymour, CT (US); Beth A. Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 14/089,869

(22) Filed: Nov. 26, 2013

(65) Prior Publication Data

US 2015/0149822 A1    May 28, 2015

(51) Int. Cl.
*G06F 11/00* (2006.01)
*G06F 11/07* (2006.01)
*G06F 11/34* (2006.01)
*H04L 12/24* (2006.01)

(52) U.S. Cl.
CPC ........ *G06F 11/0727* (2013.01); *G06F 11/079* (2013.01); *G06F 11/34* (2013.01); *H04L 41/065* (2013.01); *H04L 41/0672* (2013.01)

(58) Field of Classification Search
CPC . G06F 11/079; G06F 11/0727; G06F 11/0781
USPC ..................................................... 714/25, 26
See application file for complete search history.

(56) References Cited

U.S. PATENT DOCUMENTS

| | | | | |
|---|---|---|---|---|
| 5,661,668 | A * | 8/1997 | Yemini | G06F 11/2257 702/186 |
| 6,076,083 | A * | 6/2000 | Baker | H04L 69/40 706/45 |
| 7,389,444 | B2 * | 6/2008 | Ma | G06Q 10/10 714/26 |
| 7,500,142 | B1 * | 3/2009 | Cowart | H04L 41/065 702/183 |
| 7,730,020 | B2 * | 6/2010 | Leung | G05B 23/0275 707/600 |
| 8,171,344 | B2 * | 5/2012 | Watanabe | G06F 11/2257 714/26 |
| 8,438,179 | B2 * | 5/2013 | Wada | G06F 11/0709 707/748 |
| 2004/0250166 | A1 * | 12/2004 | Dahlquist | G05B 23/0278 714/37 |

(Continued)

FOREIGN PATENT DOCUMENTS

CN    104679602 A    6/2015

*Primary Examiner* — Elmira Mehrmanesh
(74) *Attorney, Agent, or Firm* — Nolan M. Lawrence

(57) ABSTRACT

Storage area network (SAN) components contain a processor configured to provide a first event handling module that can receive an error event at a first hardware component of the storage area network. A database is accessed that contains associations between error event data and potential sources of errors. A plurality of hardware components are identified using the database and error event data. The hardware components are ranked and one is selected based on the ranking. An error notification is sent to a second event handling module of the hardware component. Based upon the response of the second event handling module, an error handling procedure is carried out.

19 Claims, 7 Drawing Sheets

(56) References Cited

U.S. PATENT DOCUMENTS

| | | | |
|---|---|---|---|
| 2005/0097396 A1* | 5/2005 | Wood | G06F 11/2252 714/25 |
| 2006/0112061 A1* | 5/2006 | Masurkar | G06F 11/0709 706/47 |
| 2008/0263399 A1* | 10/2008 | Cousin | G05B 23/0248 714/26 |
| 2009/0063902 A1 | 3/2009 | Cowart et al. | |
| 2011/0016355 A1* | 1/2011 | Watanabe | G06F 11/2257 714/37 |
| 2011/0066908 A1* | 3/2011 | Bartz | G06F 11/0709 714/746 |

* cited by examiner

ERROR IDENTIFICATION AND HANDLING IN STORAGE AREA NETWORKS

BACKGROUND

This disclosure relates to event handling. In particular, it relates to intelligent event handling within a storage area network environment.

Storage area networks (SANs) can include a high-speed Fibre Channel network that connects host systems and storage devices. In a SAN, a host system can be connected to a storage device across the network. The connections can be made through units such as routers and switches and can be controlled by one or more storage controllers. The area of the network that contains these routers and switches can be part of the fabric of the network.

SUMMARY

In certain embodiments of the disclosure, a storage area network (SAN) is configured to provide event handling through the use of modules that are distributed throughout different components of the SAN.

Various embodiments are directed toward a computer implemented method for handling error events relating to a storage area network. The method includes receiving an error event at a first hardware component of the storage area network. In response to the error event, a first event handling module operating on the first hardware component is used to: access a database containing associations between error event data and potential sources of errors; identify a plurality of hardware components based on similarities between the associations in the database and error event data contained in the error event; generating a ranking for the plurality of hardware components; select, based on the ranking, a particular hardware component from the plurality of hardware components; transmit an error notification to a second event handling module of the particular hardware component of the plurality of hardware components; monitor the response of the second event handling module to the error notification; and carry out an error handling procedure based on the response.

Various embodiments are directed toward a system having at least one storage area network (SAN) component with a processor configured to provide a first event handling module that is configured to: receive an error event at a first hardware component of the storage area network; access a database containing associations between error event data and potential sources of errors; identify a plurality of hardware components based on similarities between the associations in the database and error event data contained in the error event; generate a ranking for the plurality of hardware components; select, based on the ranking, a particular hardware component from the plurality of hardware components; transmit an error notification to a second event handling module of the particular hardware component of the plurality of hardware components; monitor the response of the second event handling module to the error notification; and carry out an error handling procedure based on the response.

Embodiments are directed toward a computer program product for handling error events relating to a storage area network, the computer program product comprising a computer readable storage medium having program code embodied therewith, the program code readable/executable by a computer to: receive an error event at a first hardware component of the storage area network; use, in response to the error event, a first event handling module operating on the first hardware component to: access a database containing associations between error event data and potential sources of errors; identify a plurality of hardware components based on similarities between the associations in the database and error event data contained in the error event; generate a ranking for the plurality of hardware components; select, based on the ranking, a particular hardware component from the plurality of hardware components; transmit an error notification to a second event handling module of the particular hardware component of the plurality of hardware components; monitor the response of the second event handling module to the error notification; and carry out an error handling procedure based on the response.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the invention and do not limit the disclosure.

Figure 1:
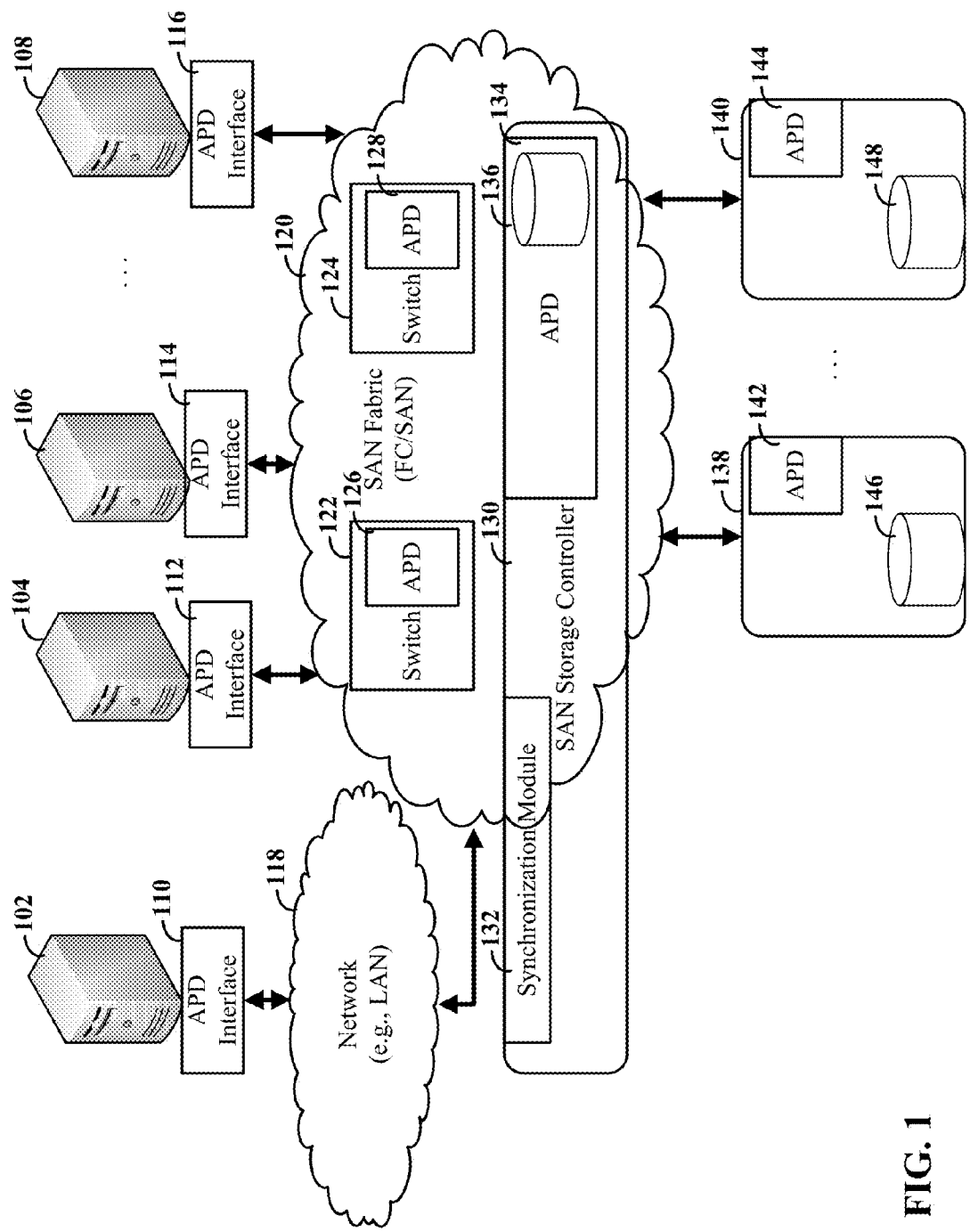
FIG. 1 depicts a block diagram of a system for providing event handling within a SAN environment, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to event handling in a storage area network, more particular aspects relate to automated identification the source of problems within a storage area network. While the present invention is not necessarily limited to such applications, various aspects of the invention may be appreciated through a discussion of various examples using this context.

Embodiments of the present disclosure are directed toward a system that is configured to perform intelligent problem analysis and problem handling in a storage area network (SAN) environment. When a system component detects an event or problem, it can request action from an event handling module (an Analytic Problem Determination (APD) module), which can be configured to identify potential sources of the problem and to perform analysis of one or more of the potential sources. This can be useful for automating problem analysis and problem source detection within a SAN environment.

Certain aspects of the present disclosure are directed toward a distributed solution to problem analysis and event handling. For instance, APD modules can be called within different physical/hardware components of the SAN environment. In this manner, an APD module can be selected based upon the particular problem. This can include, for example, selecting an APD module that runs on hardware associated with the particular portion of the SAN that is exhibiting the problem.

Various embodiments are directed toward an APD module selection algorithm that prioritizes and ranks different APD modules based upon their associated SAN hardware component. This ranking can be implemented in the form of an established hierarchy between different types of components. The hierarchy can be designed such that SAN hardware components with favorable characteristics can be selected before other SAN hardware components. For instance, a SAN hardware component that is designed to control, monitor and/or configure other SAN hardware components, such as a storage controller, may be more readily able to implement analysis of such hardware components. Certain hardware components may also have more available processing, memory and/or storage resources, which can be useful for executing an APD module. Accordingly, such hardware components can be given a relatively high priority. Other hardware components, such as a network fabric switch, can be given a lower priority.

Embodiments of the present disclosure contemplate the use of an error-solution database that associates problems or errors with different hardware components or other potential sources of problems. The database can also store relevant information about the SAN including, but not necessarily limited to, configurations of different SAN components, hardware manufacturer and version identifications, change history of SAN components (hardware or software) and firmware/software versions. This database can be used by a source APD (e.g., the APD selected by the APD module selection algorithm) to identify one or more target APDs as being useful for confirming potential sources of the problem.

In certain embodiments, a version of the error-solution database can be stored at each SAN component that has an associated APD. In this manner, each APD can use a local database, which can be useful when access to other SAN components (or to external devices) is compromised. A version of the error-solution database can also be stored remotely. For instance, a centralized error-solution database can be maintained that is accessible to multiple SANs. The centralized database can contain error-solution information collected from across many different SANs and their respective configurations and components. A particular local database can then be periodically updated with information from the centralized database or the APD can request, for a particular error or event, information from the centralized database.

According to some embodiments, SAN-based storage can be managed by a SAN storage controller in one or more "pairs" of controller hardware nodes, referred to as a clustered system or system. These nodes can be attached to the SAN fabric, along with RAID controllers and host systems. A few examples of SAN fabrics can include Fibre Channel (FC), Internet Small Computer System Interface (iSCSI) over Ethernet, or FC over Ethernet.

Consistent with embodiments, one or more SAN storage controllers can combine software and hardware into a modular appliance that provides functions for a plurality of managed disks in the storage systems. For instance, a SAN storage controller can provide symmetric virtualization that includes the creation a pool of managed disks from the attached storage systems. Those storage systems can then be mapped to a set of volumes for use by attached host systems. The system can be configured to allow access a common pool of storage on the SAN. This functionality can be used by APDs to provide a common base from which the error events can be diagnosed and handled.

Turning now to the figures, FIG. 1 depicts a block diagram of a system for providing event handling within a SAN environment, consistent with embodiments of the present disclosure. The system can include a number of hosts 102, 104, 106 and 108. These hosts can access data stored on the SAN using SAN fabric 120. One or more hosts 102 can also access the SAN through a network 118, which in some instances may be a local area network (LAN). The SAN fabric 120 can include one or more switches 122 and 124, which can be configured route requests for data access to the appropriate location. In certain instances, the switches can be fibre channel (FC) switches. In other instances, the switches can be configured to use other communication solutions, such as iSCSI over Ethernet or FC over Ethernet. One or more SAN storage controllers 130 can control access to storage devices 138 and 140 and provide additional functionality, such as virtualization, load balancing and component failure recovery for the storage solution.

The storage devices 138 and 140 can include one or more physical disks 146 and 148, which can store data for use by the hosts. The storage devices can include disk controllers that provide additional functionality, such as data mirroring and redundant array of independent disks (RAID) functions.

Embodiments are directed toward one or more APD modules 126, 128, 134, 142 and 144, which can be called in response to various SAN-related events. For instance, a device, such as one of the hosts, may detect the occurrence of an event. In response, the device can send a request to one of the SAN components that causes a (source) APD module to act on the request. The sending of the request can be carried out by an APD interface module 110, 112, 114, or 116, which can select an appropriate source APD module and format the request accordingly. The event can represent by a number of problems or occurrences including, but not necessarily limited to, failure of a SAN component, intermittent problems with data access, error codes from various sources and operator initiated requests for analysis of a problem. The source APD module can then perform various actions to respond the particular request.

Consistent with certain embodiments, the data can be transmitted between SAN components using existing diagnostic commands (such as the z/OS Attention Interrupt/Message mechanism, z/OS State Change Interrupt mechanism, or SCSI send diagnostics commands).

In certain embodiments, the source APD module can monitor for events that are associated with the event that triggered the request. For instance, if the event relates to periodic bandwidth or latency issues with accesses to a storage device, the source APD might monitor for retransmission requests or other events that may be associated with bandwidth or latency. Various embodiments allow the source APD module to retrieve and analyze data from the request in order to determine what aspects should be monitored. For instance, the request can include one or more error codes. The source APD module can extract information from the error codes and use this information to ascertain how to handle the request.

Consistent with various embodiments, the APD modules can access a database 136, which can contain information associating various events (e.g., error codes) with potential sources of the error codes and/or with potential solutions. Although not expressly shown, certain embodiments contemplate APD modules that each contains such a database. Embodiments also allow for a centralized database. Various embodiments can also have different combinations of a centralized database that is used with one or more databases that are co-located with a SAN component and corresponding APD module.

As an example of an event, a host may be having intermittent connection problems with a storage controller. The problem could originate within the host's own adapters, a fibre channel switch, the storage controller or any of the infrastructure components in between (such as a problem with a fibre channel cable). The host can use an APD interface to send a notification to the storage controller corresponding to where the problem is being seen. The notification can include an error code identifying the problem along with other relevant information, such as the time of error, contemporaneously occurring errors and actions performed by the host leading up to the error code. The storage controller's APD (the "source APD") can use the received information to search within a database to find a SAN component that is a possible source of the issue. The storage controller's APD can then communicate with the APD of SAN component (the "target APD") in order to obtain additional information and/or take corrective actions. For instance, the target APD (which may run on a fibre channel switch or other component) can initiate self diagnostics to evaluate the connectivity between component in the SAN (e.g., between the storage controller and the host). The target APD can send the results of the test as part of a confirmation notification to the source APD. The source APD can then provide relevant information (e.g., identification of a potential source of the problem) using an event notification. This event notification can be viewed by a storage administrator that can then take appropriate action (e.g., replacing a bad cable). In certain instances, the storage controller's APD can also directly initiate corrective actions, such as requesting a reset or reconfiguration of a SAN component.

Embodiments are directed toward the use of one or more synchronization modules 132. The synchronization module 132 can be configured to maintain and update the databases of the various APD modules. For instance, the system can be configured so that the database can be updated as more information is gathered regarding error codes and the sources of the error codes. In this manner, the system can adapt to new issues as well as increase the knowledge base for existing issues. Moreover, the synchronization module 132 can provide or manage software updates for the different APD modules.

Aspects of the present disclosure are directed toward different mechanisms for selecting the particular SAN component (and associated source APD module) to which a request is sent. Particular embodiments use a hierarchy of SAN components as part of the selection process.

Figure 2:
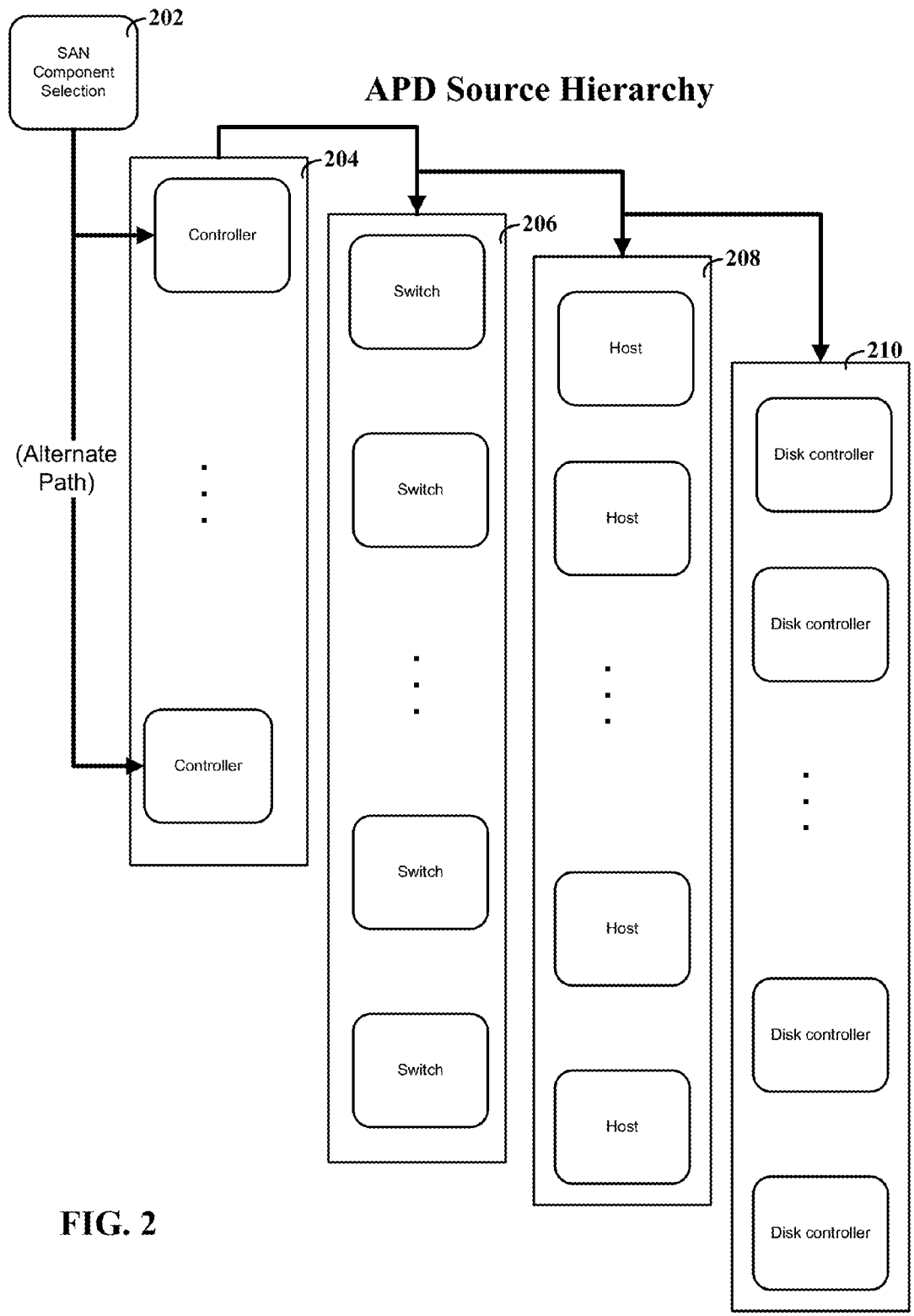
FIG. 2 depicts a block diagram for a hierarchical arrangement of SAN components, consistent with embodiments of the present disclosure.

FIG. 2 depicts a block diagram for a hierarchical arrangement of SAN components, consistent with embodiments of the present disclosure. When an error or other event is detected within the SAN environment, a SAN component selection process 202 can be initiated. This process can be carried out by traversing a hierarchy of available SAN components within the SAN environment. For instance, one or more SAN storage controllers 204 can be located as the highest/preferred SAN component. In certain embodiments, a SAN storage controller can be selected unless it is not currently available or accessible. The SAN storage controller may not be accessible when is experiencing problems or down, when the communication path to the SAN storage controller is not functioning, when the SAN storage controller or its APD module are busy or for a variety of other reasons. The SAN component selection process can then traverse the hierarchy to select other SAN components, such as fabric switches 206, hosts 208 and disk controller 210. The particular hierarchy shown in FIG. 2 can be modified according to system parameters and configurations.

For example, a host may have difficulties communicating to a storage controller through a problematic path. The host can be configured to select another good path to send the information across to the storage controller, and the information can also identify the problematic path to the storage controller's APD module. In another example, if the host is unable to communicate at all with the storage controller but can communicate with the switch, the host can send the details of the error it is seeing directly to the switch, allowing the switch to initiate a source APD module. In certain embodiments, if the host is unable to communicate with any external entities then it can be configured to initiate a local APD module. In the case of a host clustered environment, if one node in the cluster is unable to communicate with the fibre channel switch and does a failover of resources to another node in the cluster, the active node can then initiate the Analytic Problem Determination module call to locate the problem for the failed node.

In certain embodiments, the SAN component selection process can attempt to contact a SAN component using an alternative data path. For instance, if a SAN component is nonresponsive it may indicate that an intermediate node is not functioning properly. Accordingly, the SAN component may be accessible through a different data path. In one example, a disk controller may be accessible by more than one SAN controller. The SAN component selection process can access SAN configuration information to identify such an alternative path and attempt to contact the SAN component through the alternate path.

If the contacted SAN component does not appear to be the source of the problem or able to identify another source (e.g., a connecting cable), the component can notify the storage controller's APD that it does not appear to be the source of the issue. The storage controller's APD can then search the internal database again to find another likely source of the error event and the process will continue as previously described. The iterative process can continue until there are no more SAN components (sufficiently) likely to be the source of the problem. For instance, the likelihood or probability of the various SAN component being the source of a problem can be determined for each SAN. The SAN components can be ranked according to the probability and selected according to the ranking. The process can continue until there are no SAN components with a probability above a threshold level. The storage controller's APD can then generate a notification that describes the problem and indicates that the elements in the SAN have been unable to locate the source of the error event. Additional information can also be provided to assist a system operator. For instance, the notification can identify which SAN components were contacted and what tests were performed by each component. Test results could also be provided.

Certain embodiments allow for additional information about the particular event to be used with, or in place of, the hierarchical structure. For instance, a certain error code may indicate that a likely source of the problem is easily tested using an APD running on a component lower in the hierarchy. The system can be configured to allow the selection of such a component despite its relative priority and thereby allow for potential efficiencies to be achieved by directly contacting an APD that can directly confirm a likely source of the problem.

Figure 3:
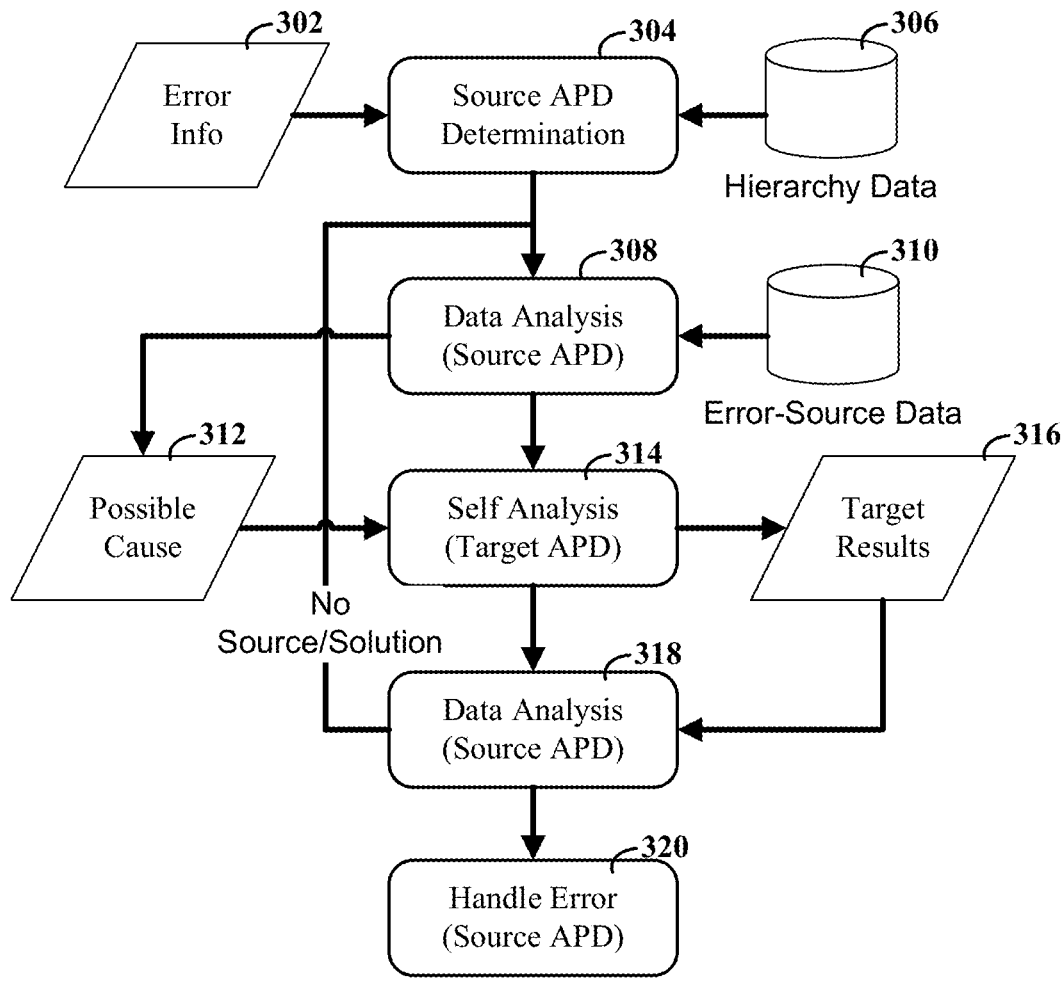
FIG. 3 depicts a flow diagram for handling SAN events and errors, consistent with embodiments of the present disclosure.

FIG. 3 depicts a flow diagram for handling SAN events and errors, consistent with embodiments of the present disclosure. When an event or error occurs, the system can determine a source APD to begin a process of finding information about the source of the event or error, as shown by block 304. This determination can originate from a variety of different sources including, but not limited to, a host device that has access to the SAN. The determination can be made based upon information such as an error code and associated information 302 and hierarchy information or data 306, which can indicate priorities used in determining/selecting a source APD. A request can then be generated and sent to the determined source APD.

The source APD can receive the request and perform an analysis on the data in the request and the data in the error-source database 310, as shown in 308. The results of the analysis can be used to identify a target APD by identifying a SAN component that is a likely source of the event or problem, or a SAN component that is capable of testing a particular source of the event or problem. For instance, a likely source of a problem may be a SAN component that does not have a APD module; however, an APD module of another SAN component may be able to readily test the problem SAN component. This APD module can then be identified as the target APD module and a message can be sent to the target APD module.

In response to receiving the message, the APD module can imitate self analysis or testing of its corresponding SAN component, as depicted in block 314. Embodiments also contemplate testing of other components that are accessible to the SAN component. In certain embodiments, the testing can be tailored toward the possible cause 312 as can be provided from the source APD. For instance, if the source APD determines that a likely cause is an improper version of a particular device driver, the target APD can query the driver for its version information. The target APD can also perform other testing as desired.

The results 316 of target APD testing/analysis can then be provided to the source APD. The source APD can receive and analyze the results, as shown in block 318. If no source or solution is found, then the source APD can continue to search for additional likely sources of the problem as shown by block 308.

If a source of the event or error is found, or no additional likely sources of the problem are found, then the source APD source can handle the error or event, as shown by block 320. This can include, for example, a notification that identifies the source of the problem, a notification that a source of the problem was not found and/or corrective action such as the reconfiguration of a source of the problem.

Figure 4:
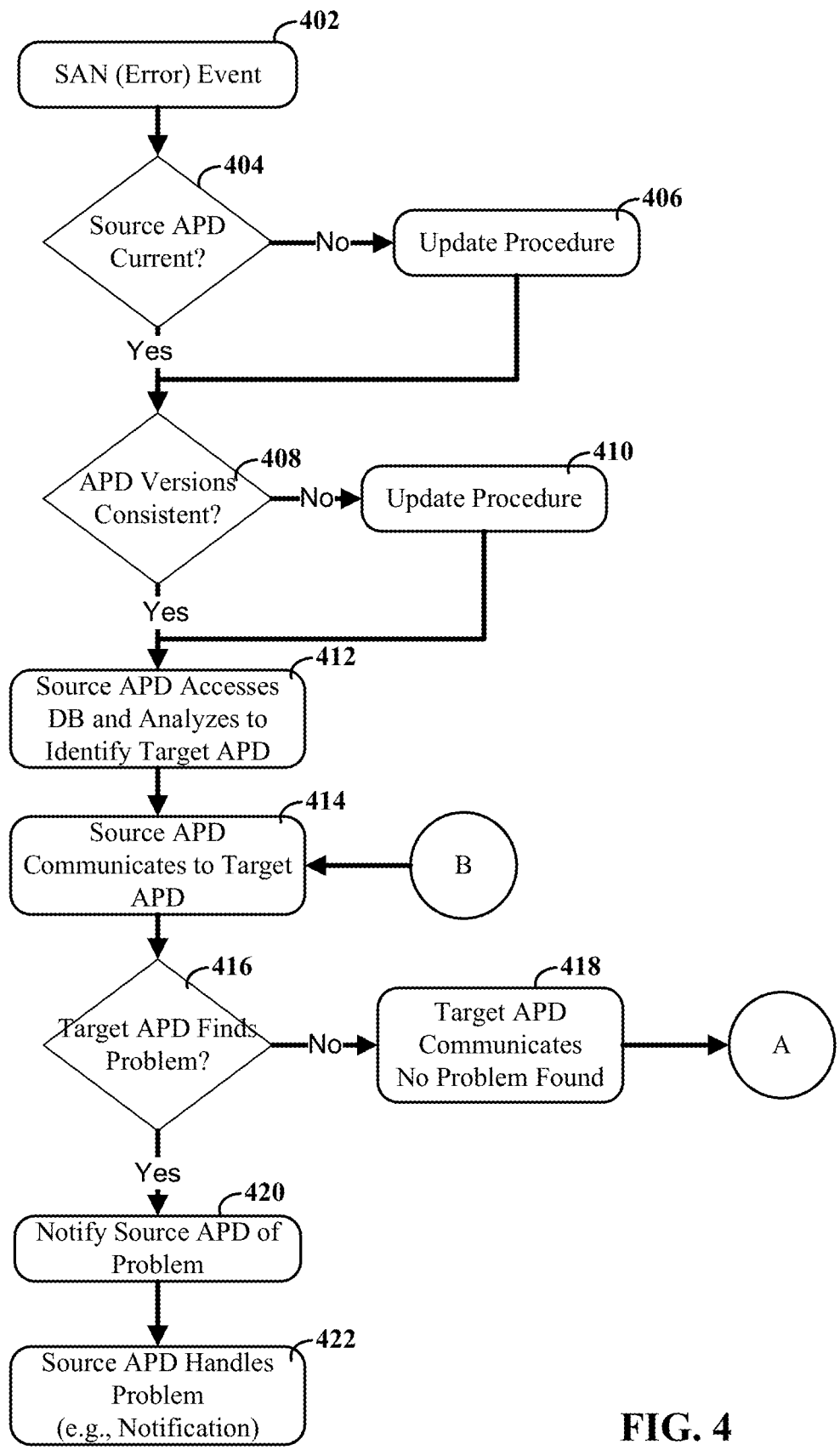
FIG. 4 shows a partial flow diagram for a particular error event handling solution that provides for synchronization and updating of modules, consistent with embodiments of the present disclosure.

FIG. 4 shows a partial flow diagram for a particular error event handling solution that provides for synchronization and updating of modules, consistent with embodiments of the present disclosure. When a SAN event (e.g., and error event) is received, per block 402, the receiving device (e.g., a host) can call or initiate a source APD. When calling the source APD, a synchronization module can also be consulted. The synchronization module can check whether or not the source APD has the current database information at block 404. In certain embodiments, this check can check (separately or in addition to the database check) whether or not the APD module code is consistent with a most current version of code. For instance, the APD module software can be occasionally updated and changed to provide additional functionality, fix errors, for compatibility with new SAN components and systems and for other reasons. Information about these updates can be made accessible to the synchronization module, which can then compare version identifier(s) of the source APD module against APD version identifier(s) that can identify updated versions. If the comparison indicates a mismatch, the APD module can be updated with a newer version.

If the source APD module is the current version, then the synchronization module can initiate an update procedure 406 to provide the most current version. If the source APD module is up-to-date, then synchronization module can check one or more of the other APD modules within the SAN for consistency with the updated source APD module, per block 408. If the versions of other APD modules are not consistent, then an update procedure 410 can be initiated for each such APD module.

The source APD module can then access the database of associations between error/event codes and SAN components as possible causes of the codes, per block 412. This information can be used to identify a target APD module. The source APD module can then send a communication to the target APD module as shown in block 414. This communication can include information about the error code, instructions for what tests to implement and other information. The target APD module can respond by performing acts designed to find or confirm whether or not a particular SAN component is the cause of the error code, per block 416. If the target APD module does not confirm or find a cause for the error code, it can notify the source APD module of this information, per block 418. The source APD module can then proceed to node "A," which carries over to FIG. 5.

If the target APD module finds a source of the problem, it can notify the source APD module of this information, per block 420. The source APD module can then handle the problem accordingly, as shown in block 422.

Figure 5:
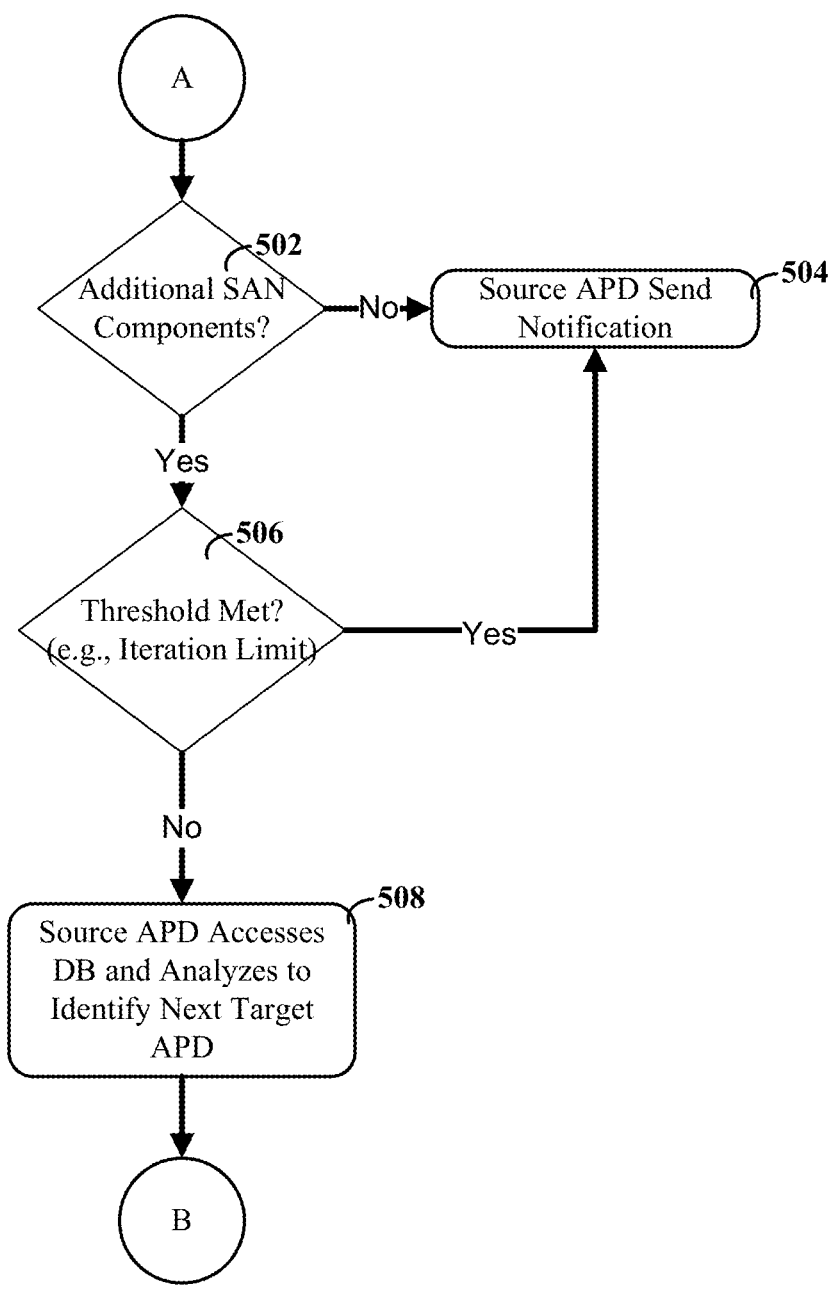
FIG. 5 shows a flow diagram for selection of additional SAN components and target event handling modules, consistent with embodiments of the present disclosure.

FIG. 5 shows a flow diagram for selection of additional SAN components and target APD modules, consistent with embodiments of the present disclosure. When a target APD module does not confirm or identify a cause of the error code, the source APD module can determine whether or not there are additional SAN components (and associated potential target APD modules) that are likely or possible sources of the error code, per decision block 502. If there are no more SAN components to check, then the source APD module can send a notification that the source of the problem was not found, per block 504.

If additional SAN components are present, then the source APD module can also check whether or not a threshold condition has been met, per block 506. In certain embodiments, this threshold condition can limit the number of iterations of selecting new SAN components and target APD modules. In various embodiments, the threshold condition can be the likelihood that a particular SAN component is the cause of the error code. For instance, the source APD module can determine the likelihood that a certain SAN components are the cause of an error code. The threshold could ensure that the system does not spend time and resources checking SAN components below a certain likelihood (e.g., 10%). Embodiments allow for multiple threshold levels, each for different factors, to be used in combination. In various embodiments the threshold level can be adjusted according to parameters, such as the severity of the error code. This can be particularly useful for limiting the use of processing, memory and communication bandwidth in proportion to the particular error or event. If the threshold is not met, then the source APD module can identify a target APD, per block 608, and continue to node B, which continues on FIG. 4 at block 414.

Figure 6:
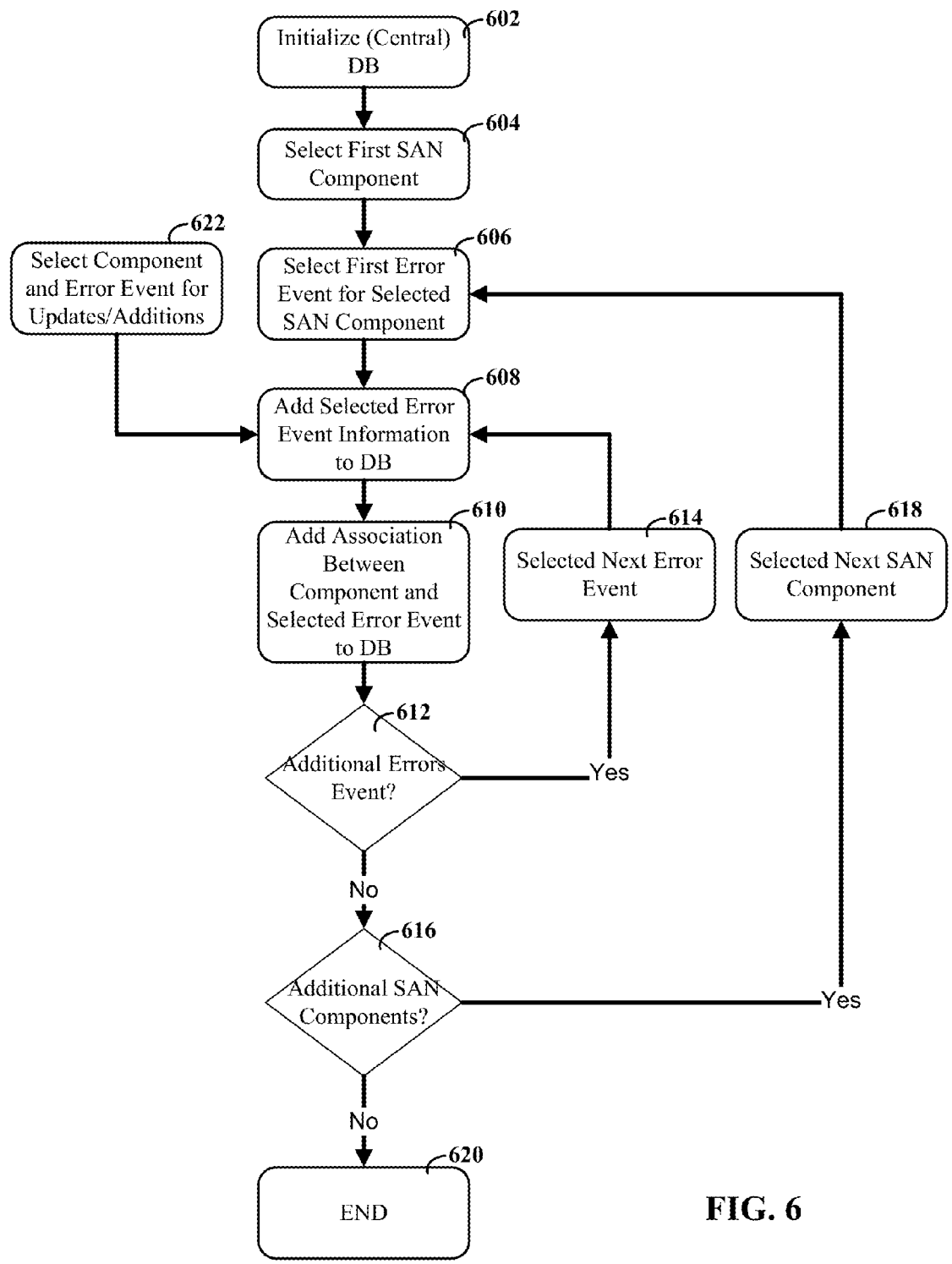
FIG. 6 depicts a flow diagram for using one or more computer processors configured with an event handling database module that can generate and maintain a database of associations between error codes and SAN components, consistent with embodiments of the present disclosure.

FIG. 6 depicts a flow diagram for using one or more computer processors configured with an APD database module that can generate and maintain a database of associations between error codes and SAN components, consistent with embodiments of the present disclosure. The flow diagram begins with a database (DB) being initialized at block 602. As discussed herein, the database can be one or more centralized databases, individual databases for each APD module and combinations thereof. The process can proceed by selecting a first SAN component from a list of SAN components in the SAN environment, per block 604. In certain embodiments, the list can be provided by a system operator and/or generated by polling/search for devices.

A first error/event code for the selected SAN component can then be selected, per block 606. In various embodiments, each SAN component can have a list of possible error codes that can be generated by or caused by the SAN component. In certain embodiments, the system can be configured to allow this list to be manually edited and thereby allow a system operator to add error codes based upon their individual knowledge and experiences. The system can also be configured to automatically generate the error event (code) list using data collected from the SAN system and possibly from other similar SAN systems.

The selected error event (and SAN component) can be added to the database, per block 608. In addition, known associations between the error event and the SAN component can also be stored, per block 610. For instance, statistics on error events and their eventual solutions and causes can be collected and used to define the associations. As an example, a particular error event may have ten recorded instances in which a first SAN component was the cause and ten recorded instances when other SAN components were the cause. The association between the error code and the first SAN component can thereby include an indication that the SAN component is approximately 50% likely to be the problem. More complex associations are also possible (e.g., taking into account situations where multiple error events are present, the configuration of the SAN components and/or what operations lead up to the error events).

The flow can continue by determining whether additional error events have associations with the selected SAN component, per block 612. If more error events exist, a next error event can be selected, per block 614, and the flow can continue through block 608. If there are no more error events, the computer processors can be configured to determine whether or not additional SAN components exist, per block 616. If additional SAN components exist, then the next SAN component can be selected, per block 618. If not, then the flow can end, per block 620.

In certain embodiments, the APD database module can be configured to dynamically update the database in response to ongoing error event recording. For instance, when a new error event is detected for a particular component, the component and error event can be selected, per block 622. These selected items can then be added to the database as shown by block 608.

Figure 7:
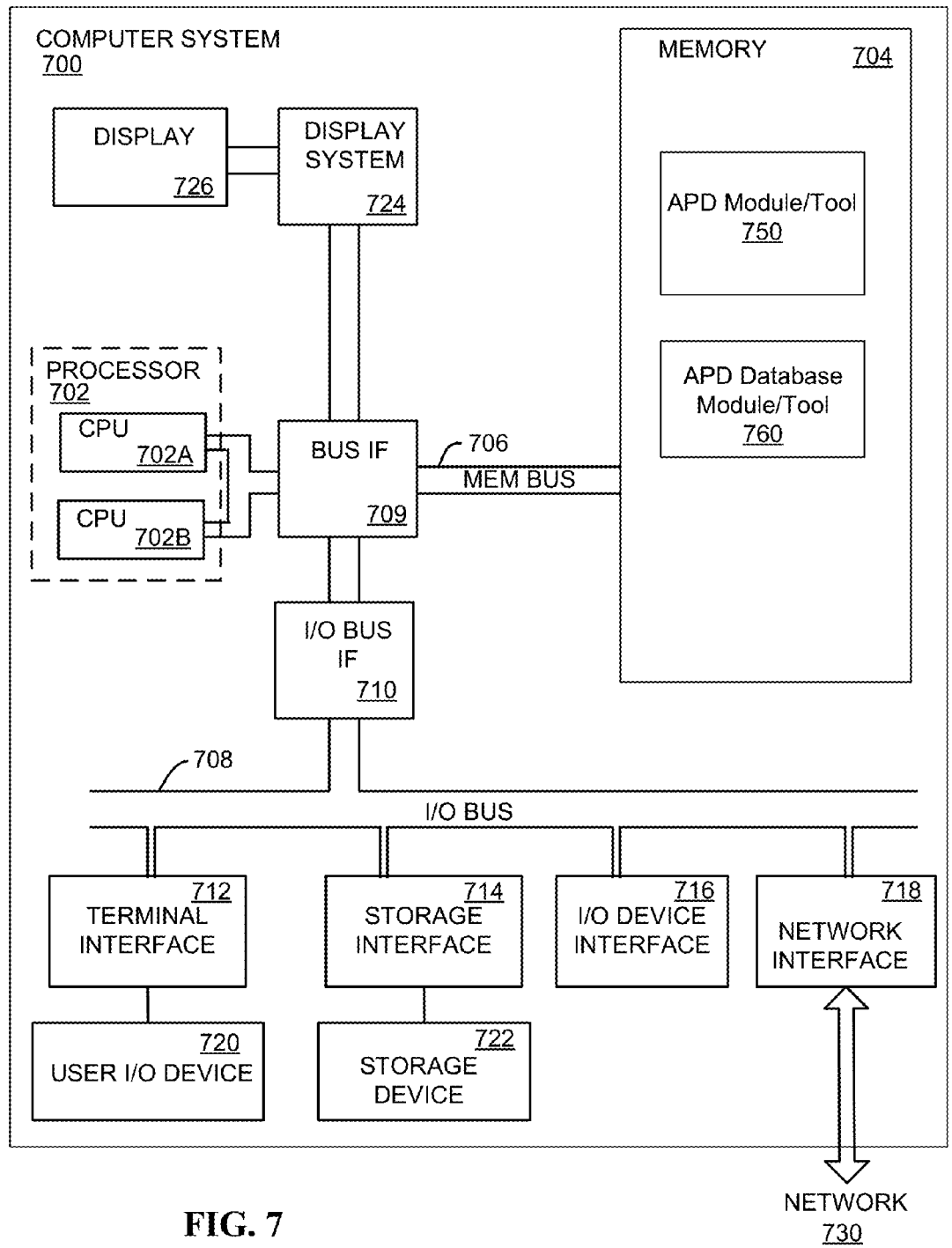
FIG. 7 depicts a high-level block diagram of a computer system for implementing various embodiments.

FIG. 7 depicts a high-level block diagram of a computer system for implementing various embodiments. The mechanisms and apparatus of the various embodiments disclosed herein apply equally to any appropriate computing system. The major components of the computer system 700 include one or more processors 702, a memory 704, a terminal interface 712, a storage interface 714, an I/O (Input/Output) device interface 716, and a network interface 718, all of which are communicatively coupled, directly or indirectly, for inter-component communication via a memory bus 706, an I/O bus 708, bus interface unit 709, and an I/O bus interface unit 710.

The computer system 700 may contain one or more general-purpose programmable central processing units (CPUs) 702A and 702B, herein generically referred to as the processor 702. In embodiments, the computer system 700 may contain multiple processors; however, in certain embodiments, the computer system 700 may alternatively be a single CPU system. Each processor 702 executes instructions stored in the memory 704 and may include one or more levels of on-board cache.

In embodiments, the memory 704 may include a random-access semiconductor memory, storage device, and/or storage medium (either volatile or non-volatile) for storing and/or encoding data and programs. In certain embodiments, the memory 704 represents the entire virtual memory of the computer system 700, and may also include the virtual memory of other computer systems coupled to the computer system 700 or connected via a network. The memory 704 can be conceptually viewed as a single monolithic entity, but in other embodiments the memory 704 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 704 may store all or a portion of the various programs, modules and data structures for processing data transfers as discussed herein. For instance, the memory 704 can store an APD or module 750 and/or APD database tool or module 760. Consistent with certain embodiments, these tools can be implemented as part of one or more database systems. These programs and data structures are illustrated as being included within the memory 704 in the computer system 700, however, in other embodiments, some or all of them may be on different computer systems and may be accessed remotely, e.g., via a network. The computer system 700 may use virtual addressing mechanisms that allow the programs of the computer system 700 to behave as if they only have access to a large, single storage entity instead of access to multiple, smaller storage entities. Thus, while the APD tool 750 and the APD database tool 760 are illustrated as being included within the memory 704, these components are not necessarily all completely contained in the same storage device at the same time. Further, although the APD tool 750 and the APD database tool 760 are illustrated as being separate entities, in other embodiments some of them, portions of some of them, or all of them may be packaged together (e.g., as part of the same monitor thread).

In embodiments, the APD tool 750 and the APD database tool 760 may include instructions or statements that execute on the processor 702 or instructions or statements that are interpreted by instructions or statements that execute on the processor 702 to carry out the functions as described herein. In certain embodiments, the APD tool 750 and the APD database tool 760 can be implemented in hardware via semiconductor devices, chips, logical gates, circuits, circuit cards, and/or other physical hardware devices in lieu of, or in addition to, a processor-based system. In embodiments, the APD tool 750 and the APD database tool 760 may include data in addition to instructions or statements.

The computer system 700 may include a bus interface unit 709 to handle communications among the processor 702, the memory 704, a display system 724, and the I/O bus interface unit 710. The I/O bus interface unit 710 may be coupled with the I/O bus 708 for transferring data to and from the various I/O units. The I/O bus interface unit 710 communicates with multiple I/O interface units 712, 714, 716, and 718, which are also known as I/O processors (IOPs) or I/O adapters (IOAs), through the I/O bus 708. The display system 724 may include a display controller, a display memory, or both. The display controller may provide video, audio, or both types of data to a display device 726. The display memory may be a dedicated memory for buffering video data. The display system 724 may be coupled with a display device 726, such as a standalone display screen, computer monitor, television, or a tablet or handheld device display. In one embodiment, the display device 726 may include one or more speakers for rendering audio. Alternatively, one or more speakers for rendering audio may be coupled with an I/O interface unit. In alternate embodiments, one or more of the functions provided by the display system 724 may be on board an integrated circuit that also includes the processor 702. In addition, one or more of the functions provided by the bus interface unit 709 may be on board an integrated circuit that also includes the processor 702.

The I/O interface units support communication with a variety of storage and I/O devices. For example, the terminal interface unit 712 supports the attachment of one or more user I/O devices 720, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 720 and the computer system 700, and may receive output data via the user output devices. For example, a user interface may be presented via the user I/O device 720, such as displayed on a display device, played via a speaker, or printed via a printer.

The storage interface 714 supports the attachment of one or more disk drives or direct access storage devices 722 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 722 may be implemented via any type of secondary storage device. The contents of the memory 704, or any portion thereof, may be stored to and retrieved from the storage device 722 as needed. The I/O device interface 716 provides an interface to any of various other I/O devices or devices of other types, such as printers or fax machines. The network interface 718 provides one or more communication paths from the computer system 700 to other digital devices and computer systems; these communication paths may include, e.g., one or more networks 730.

Although the computer system 700 shown in FIG. 7 illustrates a particular bus structure providing a direct communication path among the processors 702, the memory 704, the bus interface 709, the display system 724, and the I/O bus interface unit 710, in alternative embodiments the computer system 700 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 710 and the I/O bus 708 are shown as single respective units, the computer system 700 may, in fact, contain multiple I/O bus interface units 710 and/or multiple I/O buses 708. While multiple I/O interface units are shown, which separate the I/O bus 708 from various communications paths running to the various I/O devices, in other embodiments, some or all of the I/O devices are connected directly to one or more system I/O buses.

In various embodiments, the computer system 700 is a multi-user mainframe computer system, a single-user system, or a server computer or similar device that has little or no direct user interface, but receives requests from other computer systems (clients). In other embodiments, the computer system 700 may be implemented as a desktop computer, portable computer, laptop or notebook computer, tablet computer, pocket computer, telephone, smart phone, or any other suitable type of electronic device.

FIG. 7 depicts a representative of certain major components of the computer system 700. Individual components, however, may have greater complexity than represented in FIG. 7, components other than or in addition to those shown in FIG. 7 may be present, and the number, type, and configuration of such components may vary. Several particular examples of additional complexity or additional variations are disclosed herein; these are by way of example only and are not necessarily the only such variations. The various program components illustrated in FIG. 7 may be implemented, in various embodiments, in a number of different manners, including using various computer applications, routines, components, programs, objects, modules, data structures, etc., which may be referred to herein as "software," "computer programs," or simply "programs."

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A computer implemented method for handling error events relating to a storage area network, the method comprising:
  receiving an error event at a first hardware component of the storage area network;
  using, in response to the error event, a first event handling module operating on the first hardware component to:
    access a database containing associations between error event data and potential sources of errors;
    identify a plurality of hardware components based on similarities between the associations in the database and error event data contained in the error event;
    generate a ranking for the plurality of hardware components;
    select, based on the ranking, a particular hardware component from the plurality of hardware components;
    transmit an error notification to a second event handling module of the particular hardware component of the plurality of hardware components;
    monitor a response, of the second event handling module to the error notification;
    carry out an error handling procedure based on the response;
    perform a self test of the particular hardware component using the second event handling module
    comparing a first version identifier of the database to a second version identifier in order to identify an update to the database; and applying, in response to a mismatch between the first and second version identifiers, the update to the database.

2. The method of claim 1, further comprising:
determining that the response indicates that the particular hardware component is not the source of the error; and
transmitting, in response to determining, another error notification to another hardware component from the plurality of hardware components.

3. The method of claim 1, further comprising:
comparing a first software version identifier of the first event handling module to a second software version identifier to identify an update to the first event handling module; and
applying, in response to a mismatch between the first and second version identifiers, the update to the first event handling module.

4. The method of claim 1, wherein ranking the plurality of hardware components includes determining a probability that the hardware components are the source of the error event and ordering the hardware components based upon the probability.

5. The method of claim 1, wherein transmitting an error notification to a second event handling module of the particular hardware component of the plurality of hardware components includes transmission of at least one from a group consisting of an interrupt message and a diagnostic command.

6. The method of claim 1, further comprising using the first event handling module to select another hardware component from the plurality of hardware components by comparing a likelihood of the hardware component being the source of the error event to a threshold level.

7. A system comprising:
a first storage area network (SAN) hardware component, the first SAN hardware component being of a type selected from the group consisting of a SAN controller, a storage controller, a storage device, and a network fabric switch, the first SAN hardware component having a processor configured to provide a first event handling module that is configured to:
receive an error event related to an error at one or more hardware components of the SAN;
access a database containing associations between error event data and potential sources of errors;
identify a plurality of additional SAN hardware components of the SAN based on similarities between the associations in the database and error event data contained in the error event, each additional SAN hardware component being of a type selected from the group consisting of a SAN controller, a storage controller, a storage device, and a network fabric switch;
generate a ranking for the plurality of additional SAN hardware components;
select, based on the ranking, a particular additional SAN hardware component from the plurality of additional SAN hardware components;
transmit an error notification to a second event handling module of the particular additional SAN hardware component of the plurality of additional SAN hardware components, the error notification instructing the second event handling module to access a second database containing associations between error event data and potential sources of errors, the error notification further instructing the second event handling module to perform testing and analysis of the SAN based on the second database, and the error notification further instructing the second event handling module to respond with a response that contains the result of the performed testing and analysis;
receive the response of the second event handling module of the particular additional SAN hardware component, to the error notification; and
carry out an error handling procedure based on the response.

8. The system of claim 7, further comprising the plurality of the hardware components and wherein each hardware component is configured to provide a respective event handling module.

9. The system of claim 7, wherein the first event handling module is further configured to:
determine that the response indicates that the particular additional SAN hardware component is not the source of the error; and
transmit, in response to determining, another error notification to another SAN hardware component of the plurality of additional SAN hardware components.

10. The system of claim 7, further including a synchronization module that is configured to:
compare a first software version identifier of the first event handling module to a second software version identifier;
identify, based on the comparison, an update to the first event handling module; and
apply, in response to the identified update, the identified update to the first event handling module.

11. The system of claim 7, further including a synchronization module that is configured to:
compare a first version identifier of the database to a second version identifier of another database;
identify, based on the comparison, an update to the database; and
apply, based on the comparison and based on the another database, the update to the database.

12. The system of claim 7, wherein ranking the plurality of additional SAN hardware components includes determining a probability that the each of the plurality of the additional SAN hardware components are the source of the error event and ordering the plurality of additional SAN hardware components based upon the probability as determined.

13. A computer program product for handling events relating to a storage area network (SAN), the computer program product comprising a non-transitory computer readable storage medium having program code embodied therewith, the program code readable/executable by a computer to perform a method comprising:
receiving, by a first event handling module of a first SAN hardware component of the SAN, a request to investigate an event, the event related to a potential problem with the SAN;
analyzing, by the first event handling module and based on the received request, whether the first event handling module can directly correct the potential problem;
determining that the first event handling module is unable to directly correct the potential problem;
accessing, by the first event handling module and in response to the determination, a first database containing associations between event data and potential sources of errors;
selecting, by the first event handling module and based on the first database and based on the received request, a second event handling module of a second SAN hardware component of the SAN potentially capable of correcting the potential problem;

transmitting, by the first event handling module and to the second event handling module, a message that instructs the second event handling module to attempt to correct the potential problem;

receiving, by the first event handling module, the results of the attempt of the second event handling module; and carry out, by the first event handling module, an error handling procedure based on the results.

14. The computer program product of claim 13, wherein the second event handling module was unsuccessful in correcting the potential problem, and wherein the method further comprises:

selecting, by the first event handling module and based on the first database and based on the received request, a third event handling module of a third SAN hardware component of the SAN potentially capable of correcting the potential problem;

transmitting, by the first event handling module and to the third event handling module, a message that instructs the third event handling module to attempt to correct the potential problem;

receiving, by the first event handling module, second results of the attempt of the third event handling module; and carry out, by the first event handling module, a second error handling procedure based on the results and the second results.

15. The computer program product of claim 13, wherein the second event handling module was unsuccessful in correcting the potential problem, and wherein the error handling procedure is responding to the request to investigate with the determination and with the results of the attempt of the second event handling module.

16. The computer program product of claim 13, wherein the second event handling module was successful in correcting the potential problem, and wherein the error handling procedure is responding to the request to investigate with the results of the second event handling module.

17. The computer program product of claim 13, wherein the selecting is based on a ranking, and wherein the method further comprises:

identifying a plurality of SAN hardware components based on similarity between the associations in the database and error data contained in the received event; and generating, based on the identified plurality of SAN hardware components, the ranking.

18. The computer program product of claim 13, wherein the determining is attempting to correct the problem by the first event handling module.

19. The computer program product of claim 13, wherein the selecting the second event handling module is done without user interaction, and wherein the transmitting the message to the second event handling module is done without user interaction, and wherein the receiving the results of the attempt of the second event handling module is done without human interaction.

\* \* \* \* \*